United States Patent
Kuusisto et al.

(10) Patent No.: US 8,507,023 B2
(45) Date of Patent: *Aug. 13, 2013

(54) HEALTHY DRINK AND A METHOD FOR IMPROVING STABILITY OF A DRINK

(75) Inventors: Paivi Kuusisto, Naantali (FI); Taneli Arola, Lieto (FI)

(73) Assignee: Raisio Nutrition Ltd, Raisio (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/746,039

(22) PCT Filed: Dec. 5, 2008

(86) PCT No.: PCT/FI2008/000139
§ 371 (c)(1),
(2), (4) Date: Jun. 3, 2010

(87) PCT Pub. No.: WO2009/071737
PCT Pub. Date: Jun. 11, 2009

(65) Prior Publication Data
US 2010/0272858 A1    Oct. 28, 2010

(30) Foreign Application Priority Data
Dec. 5, 2007  (FI) ..................... 20070944

(51) Int. Cl.
*A23L 2/02* (2006.01)
(52) U.S. Cl.
USPC ............ 426/599; 426/578; 426/590; 426/615
(58) Field of Classification Search
USPC .................................. 426/590, 615, 578, 599
See application file for complete search history.

(56) References Cited

U.S. PATENT DOCUMENTS 6,168,821 B1    1/2001    Castleberry

FOREIGN PATENT DOCUMENTS

| EP | 0231729 A1 | 8/1987 |
|---|---|---|
| WO | 9507628 A1 | 3/1995 |
| WO | 9726799 A1 | 7/1997 |
| WO | 0022938 A2 | 4/2000 |
| WO | 0030457 A1 | 6/2000 |
| WO | 02065855 A2 | 8/2002 |
| WO | 03075683 A1 | 9/2003 |
| WO | 2004093571 A1 | 11/2004 |
| WO | 2006040395 A1 | 4/2006 |

OTHER PUBLICATIONS

Tuomasjukka, s. et al. 2006, "Effect of Microencapsulation of Dietary Oil on Postprandial Lipemia", Institute of Food Technologists, vol. 71, Nr. 3, 2006, bublished on Web Mar. 24, 2006.*
BoliviaBella.com 1970, http://www.boliviabella.com/health-benefits-of-acai.html, pp. 1-3/.*
Williamson et al. "Bioavailability and Bioefficacy of Polyphenols in Humans. II. Review of 93 Intervention Studies", The American Journal of Clinical Nutrition 2005, vol. 81, p. 243S-255S.
Kahkonen et al. "Berry Anthocyanins: Isolation, Identification and Antioxidant activities", Journal of the Science of Food and Agriculture 2003, vol. 83, p. 1403-1411.

* cited by examiner

*Primary Examiner* — Helen F Heggestad
(74) *Attorney, Agent, or Firm* — Brooks Kushman P.C.

(57) ABSTRACT

A method for improving the stability of a drink includes providing an oat based material, which contains from 0.01% to 40% by dry weight of starch, which includes a degraded starch present in an amount from 20 wt. % to 100 wt. % of the starch. The degraded starch includes an amyloglucosidase-degraded starch. A berry juice selected from a group is mixed with the oat based material and water to obtain a drink comprising the berry juice in an amount from 5 to 40% by weight, the oat based material as dry matter in an amount from 3 to 30% by weight and the starch in an amount of 0.01% to 2.5% by weight of the starch.

20 Claims, No Drawings

HEALTHY DRINK AND A METHOD FOR IMPROVING STABILITY OF A DRINK

FIELD OF INVENTION

The invention relates to a drink, especially to a drink that is healthy and soft tasting and has a good stability, and to a method for improving the stability of a drink.

BACKGROUND OF THE INVENTION

Oats have been traditionally consumed mainly as breakfast cereals and in bakery products. During the last years new types of oat products have been developed. Examples are non-dairy products, such as oat milk, oat based drinks, creams, desserts and fermented products such as yoghurt-like products.

Oat grain contains phytochemicals that can be classified as antioxidants. Antioxidants are substances that when present at low concentrations compared with those of an oxidizable substrate, delay or inhibit oxidation of that substrate. High consumption of antioxidant rich foods has been associated with reduced risk of chronic diseases like cardiovascular disease and cancer in epidemiological studies. The oat antioxidants consist mainly of phenolic compounds as well as tocopherols and tocotrienols. The processing methods of oat based foods affect the content of antioxidants in the final oat based products. Some of the antioxidant compounds are for example sensitive to heat treatments.

It is well known that berries have generally higher content of antioxidant compounds than other food items, such as vegetables, fruits or cereals. The spectrum of the antioxidants found in berries is also wide, including for example phenolic compounds such as flavonoids, phenolic acids and tannins. Main flavonoid subgroups in berries are anthocyanins, proanthocyanidins, flavonols and cathecins. Flavonoid profiles vary between different berries. A high proportion of anthocyanins is found e.g. in blueberries and crowberries. A high proportion of ellagitannins is found e.g. in raspberries, strawberries and cloudberries. A high proportion of flavonols (such as quercetin, kaempherol, myricetin) is found e.g. in sea buckthorn berries, cranberries, lingonberries, black currants and gooseberries. The health effects of flavonoids have so far been mainly demonstrated in vitro and in animal studies. In human trials the results have been more variable. However, for flavonols, especially quercetin, there are sufficient intervention trials to indicate the health effects among humans in vivo. Quercetin influences some carcinogenesis markers and has effects on plasma antioxidant biomarkers in vivo (Williamson and Manach, Am. J. Clin. Nutr., 2005; 81:243 S-255S).

EP0231729 discloses a process to manufacture products starting from whole flour of starch-containing cereal grains, such as wheat, barley, oat, rye, rice, maize or sorghum. The carbohydrates are enzymatically degraded while the remaining components of the whole flour are maintained substantially intact. The product prepared by the process has a fairly high dry matter content (33-46%) and it is mentioned that the product can be used as powder drinks or in nutritional drinks.

EP0731646 discloses a homogenous and stable cereal suspension prepared from oats by a specific process. The suspension may be used as basis for or additive to ice cream, gruel, yoghurt and milkshake, or as health drink or snack between meals.

EP0883349 discloses an enzymatic process for forming a functional syrup from oat material or waxy barley. Especially non-dairy frozen confections are disclosed. Also the addition of the syrup into carbohydrate-loading beverages is mentioned.

WO00/30457 discloses an enzymatic process for producing a liquid oat base. The base can be added to other drink ingredients such as orange juice or milk or it can be dried into a powder.

Both EP1123012 and EP1383396 disclose an enzyme modified cereal suspension prepared by a specific process from grains e.g. oats, barley, rice, wheat, maize, rye, sorghum, triticale and pearl millet. The cereal suspensions can be used as milk substitute, as the basis for or an additive in the manufacture of ice cream, gruel, yoghurt, milkshakes and snacks.

WO03/075683 discloses a modified starch containing liquid and a preparation method thereof. The modified starch containing liquid may be used as such or as an ingredient for different food and feed products and compositions.

U.S. Pat. No. 6,168,821 discloses a beverage containing natural fiber, glucans and a flavoring agent. The glucans are substantially derived from a natural grain. The flavoring agent is preferably vanilla.

EP1816920 discloses an edible fiber composition in liquid form that contains soluble and non-soluble dietary fibers.

WO2004/093571 describes e.g. cereal milk based drinks in which the bitter, sour and/or astringent taste has been masked with plant sterol ester and/or plant stanol ester.

There are some oat based drink products containing berries or berry juices on the market e.g. drinks that contain strawberry juice, raspberry or blackberry. Strong tasting berry juices, such as sea buckthorn juice, have been added only in small quantities (0.3-1.3%) into oat based drinks. Prior art does not disclose oat based drinks having strong tasting berry juices in higher concentrations.

Often the strong tasting berries, such as sea buckthorn berry, lingonberry, cranberry and black currant have also the highest content of a certain antioxidant compound, quercetin, among berries.

It would be beneficial to widen the range of berries used in oat based drinks for several health and nutritional reasons. Also increasing the concentration of the berry juice in the drinks will improve these effects. It would also be beneficial to have oat based drinks that would have improved taste and/or improved stability as well as increased content of different antioxidants compared to the content found in the processed oat based drinks in the prior art. It would also be an advantage to use natural antioxidants and to avoid adding antioxidants as artificial additives.

The present invention provides products meeting one or more of these requirements.

SUMMARY OF THE INVENTION

The present invention provides oat based non-dairy drinks with improved stability. The present invention is directed to oat based drinks containing berry juices. The present invention is directed to oat based berry drinks where the berry and the berry concentration has been chosen to favourably affect the stability of the drink.

The invention is more preferably directed to the use of berries having a high content of certain antioxidant compounds, especially flavonols, e.g. quercetin. The products of this invention contain both oat derived and berry derived antioxidants.

The invention is preferably directed to the use of strong tasting berries in the oat based berry drinks.

Preferably the invention provides oat based berry drinks with good stability, soft taste and containing strong tasting berries. Most preferably the invention provides oat based berry drinks with good stability, soft taste, a high content of quercetin and containing strong tasting berries. The antioxidativity of the drink is higher than the antioxidativity of oat milks or oat suspensions.

The invention is further directed to a method for improving the stability of an oat based drink.

The characterising features of the present invention are set forth in the claims.

DETAILED DESCRIPTION OF THE INVENTION

The present invention provides an oat based berry drink with improved stability. It was surprisingly found that certain berry juices favourably affect the structure and stability of the oat based berry drinks when used in sufficient concentrations. Certain other berry juices do not have this favourable effect or even have an opposite, deteriorating effect on the stability of the oat based drinks. By improved stability is here meant that the particles of the drink are separating to a lower degree during a certain time period as compared to the corresponding drink containing water instead of the certain berry juices.

The berries used in the oat based berry drinks of the present invention preferably have a strong taste. It was found that the oat suspension softens the taste, especially of the strong tasting berries (i.e. berry juices), which otherwise taste strongly bitter. On the other hand, it was also noticed that the strong oat taste or oat aftertaste of oat drinks, even when the drinks contain quite high amounts of oat based material, is softened (neutralised) by the berry juices. One aim of the invention is soft (smooth) tasting products which can be prepared even when higher concentrations of strong tasting berry juices are used than in the prior art.

Preferably the invention also provides oat based drinks with enhanced antioxidativity (radical scavenging activity). The enhanced antioxidativity is achieved with natural ingredients, berries, by combining oat derived antioxidants and berry derived antioxidants in the drink. Preferably berries containing more than 35 mg/kg (35 ppm) fresh weight quercetin are used. The drinks therefore are healthy, and further their shelf-life is improved due to the enhanced antioxidativity. The antioxidativity of the drink is at least doubled compared to a drink with corresponding content of oat based material without any berry juice. Preferably the drink according to the invention contains at least 0.5 ppm quercetin.

Preferably the invention provides oat based drinks with good stability and enhanced antioxidativity. Also the taste of the drinks is soft and well-accepted by consumers. The enhanced stability, soft taste and the enhanced antioxidativity are obtained by combining oat with certain berry juices. The oat based berry drinks comprise antioxidants from both the oat raw material and from the berries that have been used. The improved stability compared to the sole oat based drink is achieved by using certain berries. It has been found that certain berry juices, when used in sufficient concentrations improve the stability and structure of the oat based drinks while some other berry juices, such as blueberry juice and strawberry juice, do not have this effect.

The invention is related to a drink which comprises berry juice, water and oat based material, which oat based material optionally contains starch, wherein
- the amount of oat based material is from 3 to 30% by weight of the drink,
- the amount of berry juice is from 5 to 40% by weight of the drink,
- the berry juice is selected from the group consisting of sea buckthorn berry juice, lingonberry juice, cranberry juice, red currant juice, black currant juice, gooseberry juice, bog whorthleberry juice, crowberry juice, chokeberry juice and mixtures thereof, and
- the amount of starch is from 0 to 2.5% by weight of the drink.

The "oat based material" comprises oat material with a reduced amount of starch compared to conventional oat flakes and oat flour. The starch content is from 0 to 40% by dry weight, preferably from 0 to 30% by dry weight, and most preferably from 0 to 20% by dry weight of the oat based material. Typically, the oat based material comprises starch from 0.01 to 40% by dry weight, more preferably from 0.05 to 30% by dry weight, and most preferably from 0.1 to 20% by dry weight of the oat based material. The amount of starch can be measured by AOAC official method 996.11. If the amount of starch is too high the stability of the drink will suffer or the product will even be undrinkable because of gel formation.

The oat based berry drink according to the present invention preferably comprises an oat suspension and berry juice.

The drink according to the invention preferably comprises an oat suspension which comprises the oat based material and at least part of the water e.g. at least 50% by weight of the water, preferably all water. The drink is then prepared by adding the oat based material and at least part of the water, e.g. at least 50% by weight of the water, preferably all water, in the form of an oat suspension. Advantageously, the drink comprises the oat suspension in an amount from 60 to 95% by weight, preferably from 65 to 94.5%, more preferably from 70 to 94% still more preferably from 75 to 93.5%, most preferably from 80 to 93% by weight of the oat based berry drink. Especially when using strong tasting berry juices preferably an even higher amount of oat suspension may be used e.g. from 85 to 95% by weight of the oat based berry drink.

As used here "oat suspension" refers to a suspension comprising oat based material and water. Suitable preparation methods for the oat suspension is disclosed e.g. in WO03/075683, EP0731646, EP1123012 and EP1816920.

Preferably the oat suspension has been prepared by method(s) that at least partly degrade oat starch. Preferably the oat suspension has been prepared by using enzymes that at least partly degrade the oat starch. Suitable enzymes include, but are not restricted to, various amylases, such as alpha- and beta-amylases, amyloglucosidases and pullulanases. Preferably at least 20%, more preferably at least 50% and still more preferably at least 80% of the oat starch has been degraded compared to the starch amount in conventional oat flakes. Most preferably the oat starch has been totally degraded. Preferred oat suspensions contain starch degradation products, such as sugars (e.g. glucose, maltose) and maltodextrin. Also some undegraded starch may be present. The preferred oat suspensions contain also other oat derived components, such as proteins, fat and fibre. In addition to starch, also other oat derived components, such as protein or fibre components, may be partly or totally degraded by enzymatic or by other means.

Preferably the fibre component of the oat suspension, such as beta-glucan, has been at least partly degraded in the oat suspension preparation process. More preferably the fibre component of the oat suspension, such as beta-glucan, has been totally degraded. However, also oat suspensions containing beta-glucan may be utilised in the present invention.

Oat based material in the form of an oat powder made e.g. by drying an oat suspension (see e.g. WO00/30457) may also be used by suspending the powder in water, in berry juice or in their mixture.

As used here, by the term "berry juice" is meant the material that can be obtained from berries e.g. by pressing, steamextraction or by other means used in the juice production. Berries are small fruits with multiple seeds that are called berries in the common language and that are suitable for human consumption. Often berries are juicy and have bright colour. Juices from fruits, such as citrus fruits, apples, bananas, pineapples, cherries and others that are in common language understood as fruits, are not included in the term "berry juice" here. Berries contain generally more antioxidant activity than fruits. The berry juice can originate from one kind of berries or be a mixture of juices from different berries. The pressing cake including seeds and peels/skins is conventionally removed from the berry juices. The berry juice can be concentrated by removing water from it and if required, the concentrates can be diluted again. In this specification the berry juice is meant to mean the 100% juice of berries i.e. the natural concentration of the juice obtained from berries.

Suitable berries that are used as raw material of the berry juice(s) in this invention are sea buckthorn berries, lingonberries, cranberries, red currants, black currants, gooseberries, bog whortleberries, crowberries and chokeberries. Preferred berries comprise sea buckthorn berries, lingonberries, cranberries, red currants, black currants and gooseberries. More preferred berries are sea buckthorn berries, lingonberries, cranberries, red currants, and black currants. Even more preferred berries are sea buckthorn berries, lingonberries, cranberries and red currants. Still even more preferred berries are sea buckthorn berries, lingonberries and cranberries. Further more preferred berries are sea buckthorn berries and lingonberries. Most preferred berries are sea buckthorn berries.

As strong tasting berries can in this respect following berries be mentioned: sea buckthorn berries, lingonberries, cranberries, red currants, and black currants. More preferred berries are sea buckthorn berries and lingonberries, and most preferred berries are sea buckthorn berries.

The oat based berry drink can be prepared by conventional drink preparation methods. The preparation steps include mixing the raw materials. The preparation steps may also include homogenisation step(s) and heat treatment step(s). Heat treatments commonly known in the art, such as pasteurization or UHT-treatment, can be used. The preparation steps may also include fermentation, but preferably the oat based berry drinks according to the invention are not fermented.

The oat based berry drink comprises at least 5% by weight and at most 40% by weight, preferably at most 30% and most preferably at most 20% by weight berry juice or a mixture of berry juices chosen from the berries suitable for use in the present invention. Typically the oat based berry drink comprises from 5 to 40%, preferably from 5.5 to 35%, more preferably from 6 to 30%, still more preferably from 6.5 to 25% and most preferably from 7 to 20% by weight berry juice or a mixture of berry juices chosen from the berries suitable for use in the present invention. The most preferred amount of strong tasting berry juices, especially sea buckthorn berry juice and lingonberry juice is from 5 to 15% by weight of the drink. Other berry juices may also be added in addition, but preferably only the berries chosen in this invention are used.

The oat dry matter (oat based material) content of the oat based berry drink is 3-30%, preferably 4-25%, more preferably 5-20%, most preferably 5-15% by weight.

The amount of starch in the drink according to the invention is from 0 to 2.5% by weight, preferably from 0 to 2.0% by weight, more preferably from 0 to 1.5% by weight, and most preferably from 0 to 1.0% by weight. The amount of starch can be measured by AOAC official method 996.11. Typically, the amount of starch in the drink is from 0.01 to 2.5% by weight, preferably from 0.03 to 2.0% by weight, more preferably from 0.05 to 1.5% by weight, and most preferably from 0.1 to 1.0% by weight. Preferably the starch is substantially derived from the oat based material.

Preferably the weight ratio of oat dry matter (oat based material) to 100% berry juice in the oat based berry drink is from 1:0.3 to 1:5, more preferably from 1:0.4 to 1:3, even more preferably from 1:0.5 to 1:2, and most preferably from 1:0.7 to 1:1. Especially when the juice is made from strong tasting berries the ratio of oat dry matter (oat based material) to 100% berry juice is preferably from 1:0.3 to 1:3, more preferably from 1:0.3 to 1:2, and most preferably from 1:0.3 to 1:1.2. The same ratio for juices of strong tasting berries may still more preferably be $1{:}{\geqq}0.4$ and $1{:}{\geqq}0.5$.

An especially preferred embodiment of the present invention is an oat based berry drink containing sea buckthorn berry juice.

The present invention is directed to oat based drinks having a viscosity of at most 700 mPas, preferably at most 500 mPas, more preferably at most 300 mPas, even more preferably at most 200 mPas, and most preferably at most 100 mPas. The measurement was performed at 20° C. using a Brookfield Model LVDV II viscometer (spindle 2, 100 rpm).

The oat based berry drinks of the present invention may also comprise optional ingredients such as stabilising agents, emulsifiers, colouring agents and flavouring agents. The drinks of the present invention can also contain other nutritionally beneficial components. Examples of such nutritionally beneficial components include plant sterols and/or plant stanols, n-3 fatty acids, probiotics, dietary fibre (e.g. soluble β-glucan) and mixtures thereof. Plant sterols and/or plant stanols are preferably added in a form of plant sterol ester and/or plant stanol ester. Other examples of the beneficial nutritional components include beneficial minor components, for example vitamins and minerals, such as calcium. Some of the other nutritionally beneficial components, especially plant sterol ester and/or plant stanol ester and oils rich in n-3 fatty acids (e.g. containing at least 5%, preferably at least 10%, more preferably at least 15% n-3 fatty acids of the fatty acid content of the oil) also further enhance the favourable effects of the preferred berries on the structural stability of the oat based berry drinks. Further antioxidants may also be added such as in the form of green tea extract. The oat based berry drinks of the present invention may also comprise other cereal material, such as wheat, rice or barley, or soy based material, such as soymilk or soy protein. Fruit and/or vegetable juice(s) may also be included in the drinks according to the invention. The drinks according to the invention may further contain berry juice(s) from one or more other berries than those mentioned as suitable for this invention.

In this specification the plant sterols include 4-desmethyl sterols, 4-monomethyl sterols and 4,4-dimethyl sterols (triterpene alcohols) and the plant stanols include 4-desmethyl stanols, 4-monomethyl stanols and 4,4-dimethyl stanols. Typical 4-desmethyl sterols are sitosterol, campesterol, stigmasterol, brassicasterol, 22-dehydrobrassicasterol and Δ5-avenasterol. Typical 4,4-dimethyl sterols are cycloartenol, 24-methylenecycloartenol and cyclobranol. Typical stanols are sitostanol, campestanol and their 24-epimers, cycloartanol and saturated forms obtained by saturation of e.g. triterpene alcohols (cycloartenol, 24-methylenecycloartenol and cyclobranol). The terms "plant sterol" and "plant stanol" include all possible mixtures of named sterols and/or stanols as well as any individual sterol or stanol. Preferably the plant sterol and/or plant stanol are desmethyl sterols and/or desmethyl stanols.

As used here, the term "plant sterol ester" or "plant stanol ester" refers to plant sterols or plant stanols having at least 60%, preferably at least 85%, most preferably at least 95% of the plant sterols and/or plant stanols in esterified form. In this invention the plant sterols and/or plant stanols are esterified with an organic acid. Examples of suitable organic acids are fatty acids (2-24 carbon atoms, saturated, monounsaturated or polyunsaturated, including also special fatty acids, such as conjugated fatty acids, e.g. CLA, and EPA and DHA), hydroxybenzoic acids, hydroxycinnamic acids (ferrulic and coumaric acids), di- and tricarboxylic acids and hydroxy acids, and any mixture of said acids. Preferably the plant sterols and/or plant stanols are esterified with fatty acids, most preferably with vegetable oil based fatty acids.

The preferred amount of plant sterol ester and/or plant stanol ester is 0.1-10%, more preferably 0.3-9%, even more preferably 0.5-8%, most preferably 1-7% by weight of the drink.

Examples of oils rich in n-3 fatty acids include fish oils and vegetable oils such as camelina oil, linseed oil or rapeseed oil. Preferred oils are of vegetable origin, thus making the oat based berry drink suitable also for vegetarians. The preferred amount of oil having a fatty acid content of at least 5%, preferably at least 10%, most preferably at least 15% n-3 fatty acids is 0.1-10%, more preferably 0.5-9%, even more preferably 0.8-8%, most preferably 1-7% by weight of the drink.

The drink according to the invention preferably contains no stabilising agent. The added berry juices as selected in this invention are effective enough to stabilise the drink when added in suitable amounts. However, it is possible to include also conventional stabilising agents, e.g. pectin, gums and modified starch, in the drink in order to further stabilise it. The stabilising agent is then used in small amounts e.g. the total amount of stabilising agents is at most 1.0%, preferably at most 0.7%, more preferably at most 0.5% and most preferably at most 0.3% by weight of the drink.

The drink according to the invention preferably contains no flavouring agent. The tastes of the berry juice and the oat based material suitably balance each other when added in amounts according to the invention so that it is not necessary to add any flavouring agent, such as vanilla and/or almond. However, flavouring agents may be added e.g. when some other aroma of the drink is wanted.

Preferably, the drinks do not contain milk or gluten and are therefore suitable for lactose intolerant people or people having celiac disease.

The invention is also directed to a method for improving the stability of a drink comprising oat based material, which contains from 0 to 40% by dry weight of starch, which comprises
    providing a berry juice selected from the group consisting of sea buckthorn berry juice, lingonberry juice, cranberry juice, red currant juice, black currant juice, gooseberry juice, bog whorthleberry juice, crowberry juice, chokeberry juice and mixtures thereof, and
    mixing the oat based material, water and the berry juice to obtain a drink comprising the berry juice in an amount from 5 to 40% by weight, the oat based material in an amount from 3 to 30% by weight and the starch in an amount of 0 to 2.5% by weight.

Preferably the oat based material and at least part of the water is added in the form of an oat suspension and more preferably the oat suspension is added in an amount from 60 to 95% by weight of the drink.

The method is preferably applicable for preparing all drinks according to this invention.

Example 1

Stability of the Drinks

Oat Based Sea Buckthorn Berry Drinks

Oat based sea buckthorn berry drink with varying content of sea buckthorn berry juice.

The stability of the oat based berry drinks was tested using oat based sea buckthorn berry drinks with varying content of sea buckthorn berry juice. The drinks were prepared according to the recipes below.

The drink samples were prepared of oat suspension and sea buckthorn berry juice. The sea buckthorn berry juice did not contain seeds or the skins of the berries. The sea buckthorn berry juice was 100% juice.

The oat suspension was prepared of oat flakes and water as described in WO 03/075683 example 2. The oat dry matter content of the oat suspension was 9.4% by weight.

The oat suspension, water and sea buckthorn juice were mixed (compositions given in Table 1) and warmed up to 60° C. The mixture was homogenised at 60° C. in two phases using 150/50 bar pressure. Camelina oil (60° C.) was added to drink 6 and plant stanol ester (Benecol® Classic) (60° C.) to drink 7 prior to homogenisation. The drinks were allowed to cool to room temperature, mixed thoroughly and poured to measuring cylinders. The measuring cylinders were allowed to stand at 4° C. for 7 days. The stability of the drinks was compared to a reference oat drink containing same amount of oat based material (DM, dry matter) but no berry juice, oil or plant stanol ester. The stability was measured as % of separated material in the test drink of the separated material in the reference oat drink.

The oat dry matter content (oat based material) of the drinks was 7.7% by weight. The berry juice content of the drinks was 1.3, 4, 5, 7 or 15% by weight. One of the drinks (drink 6) contained also camelina oil (1.5%) and one of the drinks (drink 7) plant stanol ester (1.5%).

In the reference oat drink the volume of the separated material was 9% after 3 days, 12% after 4 days and 21% after 7 days of the total volume of the reference oat drink. The volume of the separated material in the test drinks is compared to the volume of the separated material in the reference drink in Table 2.

TABLE 1

Recipes of the drinks (g/100 g)

|  | drink 1 | drink 2 | drink 3 | drink 4 | drink 5 | drink 6 | drink 7 | reference oat drink |
|---|---|---|---|---|---|---|---|---|
| Sea buckthorn berry juice | 1.3 | 4 | 5 | 7 | 15 | 7 | 7 |  |
| Oat based material (DM) | 7.7 | 7.7 | 7.7 | 7.7 | 7.7 | 7.7 | 7.7 | 7.7 |
| Water | 91.0 | 88.3 | 87.3 | 85.3 | 77.3 | 83.8 | 83.8 | 92.3 |
| *Camelina* oil |  |  |  |  |  | 1.5 |  |  |
| Plant stanol ester |  |  |  |  |  |  | 1.5 |  |

TABLE 2

Stability results

| Oat - sea buckthorn berry drinks | difference to the reference drink (%), 3 d | difference to the reference drink (%), 4 d | difference to the reference drink (%), 7 d |
|---|---|---|---|
| Drink 1 | 0.0 | 0.0 | +4.8 |
| Drink 2 | 0.0 | 0.0 | +4.8 |
| Drink 3 | −11.1 | −8.3 | −4.8 |
| Drink 4 | −11.1 | −16.7 | −4.8 |
| Drink 5 | −22.2 | −16.7 | −14.3 |
| Drink 6 | −33.3 | −33.3 | −14.3 |
| Drink 7 | −44.4 | −33.3 | −19.0 |

After 3 days, the drinks having the lowest concentrations of sea buckthorn berry juice (drinks 1 and 2) had separated to the same extent as the reference drink (difference to the reference drink 0%). Drinks 3 and 4, containing 5% or 7% sea buckthorn berry juice respectively, had better stability than the reference drink (11.1% less separated material than in the reference drink). The stability was even more improved with higher content of sea buckthorn berry juice (drink 5). Stability was even further improved by addition of camelina oil (drink 6; 33.3% less separated material than in the reference drink) and even more with plant stanol ester (drink 7; 44.4% less separated material than in the reference drink).

After 4 days, the drinks having the lowest concentrations of sea buckthorn berry juice (drinks 1 and 2) had separated as much as the reference drink. The drinks having a higher concentration of sea buckthorn berry juice were more stable than the reference drink. The drinks with camelina oil or plant stanol ester had the best stability also after 4 days.

After prolonged storage (7 days) the differences between the test drinks and the reference oat drink were smaller than at earlier time points. However, the drinks having sufficient amount of sea buckthorn berry juice or sea buckthorn berry juice together with camelina oil or plant stanol ester still had better stability and contained less separated material than the reference oat drink.

It was found that sea buckthorn berry juice favourably affected the structure and stability of the oat based berry drinks when at least 5% sea buckthorn berry juice was used compared to the reference oat drink of the same oat concentration. It was also found that adding camelina oil or plant stanol ester further improved the favourable effect that the sea buckthorn berry juice had on the stability of the oat based berry drinks.

Example 2

Stability of the Drinks

Oat Based Lingonberry Drinks

The stability of oat based lingonberry drinks was compared to the stability of reference oat drink with a similar test procedure as in example 1 except that the stability of the drinks was measured after 4 days storage.

The oat based lingonberry drinks were prepared according to the recipes in Table 3. The oat suspension was prepared as in example 1 and the drinks were prepared in the same way as the drinks of example 1. The lingonberry content of the drinks was 4% and 7%. The same reference oat drink was used as in the example 1.

TABLE 3

Recipes of the drinks and stability results

| Recipes (g/100 g) | drink L1 | drink L2 | reference oat drink |
|---|---|---|---|
| Lingonberry juice | 4 | 7 | |
| Oat based material (DM) | 7.7 | 7.7 | 7.7 |
| Water | 88.3 | 85.3 | 92.3 |
| Stability results | | | |
| Difference to the reference drink (%), 4 d | +16.7 | −25.0 | |

Lingonberry juice was found to have favourable effect on the stability of the oat based berry drinks when used in sufficient concentrations. 4% lingonberry concentration had an adverse effect. When the lingonberry concentration was raised, the stability of the oat based lingonberry drinks was improved and was better than the stability of the reference oat drink.

Example 3

Stability of the Drink

Oat Based Cranberry Drink

The stability of an oat based cranberry drink was compared to the stability of reference oat drink with a similar test procedure as in example 1 except that the stability of the drink was measured after 4 days storage.

The oat based cranberry drink was prepared according to the recipe below (Table 4). The oat suspension was prepared as in example 1 and the oat cranberry drink was prepared in the same way as the drinks of example 1. The cranberry content of the drinks was 7%. The same reference oat drink was used as in example 1.

TABLE 4

Recipes of the drinks and stability results

| Recipes (g/100 g) | drink C1 | reference oat drink |
|---|---|---|
| Cranberry juice | 7 | |
| Oat based material (DM) | 7.7 | 7.7 |
| Water | 85.3 | 92.3 |
| Stability results | | |
| Difference to the reference drink (%), 4 d | −16.7 | |

Also cranberry juice was found to have a favourable effect on the stability of the oat based berry drinks compared to the reference oat drink.

Example 4

Comparative Example

Stability of the Drink

Oat Based Blueberry Drink

The stability of an oat based blueberry drink was compared to the stability of reference oat drink with a similar test procedure as in example 1. The stability of the drink was measured after 3, 4 and 7 days storage.

The oat blueberry drink was prepared according to the recipe below (Table 5). The oat suspension was prepared as in example 1 and the drink was prepared in the same way as the drinks of example 1. The blueberry content of the drink was 7%. The same reference oat drink was used as in example 1.

TABLE 5

Recipes of the drinks and stability results

| Recipes (g/100 g) | drink B1 | reference oat drink |
|---|---|---|
| Blueberry juice | 7 | |
| Oat based material (DM) | 7.7 | 7.7 |
| Water | 85.3 | 92.3 |
| Stability results | | |
| Difference to the reference drink (%), 3 d | +87.5 | |
| Difference to the reference drink (%), 4 d | +50.0 | |
| Difference to the reference drink (%), 7 d | +23.8 | |

Blueberry juice was found to have an adverse effect on the stability of the oat based berry drink. The blueberry concentration that was used in the test (7%) was the same concentration that had been found to work well with the other berries. Blueberry did not have a favourable effect on the stability of the oat based berry drink.

Example 5

Comparative Example

Stability of the Drink

Oat Based Strawberry Drink

The stability of oat based strawberry drink was compared to the stability of reference oat drink with a similar test procedure as in example 1 except that the stability of the drink was measured after 4 days storage.

The oat strawberry drink was prepared according to the recipe below (Table 6). The oat suspension was prepared as in example 1 and the oat strawberry drink was prepared in the same way as the drinks of example 1. Strawberry juice concentrate was used. The 100% strawberry juice content of the drink was 7%. The same reference oat drink was used as in example 1.

Strawberry juice was found to have no favourable effect on the stability of the oat based berry drink compared to the reference oat drink. The oat based strawberry drink separated to the same extent as the reference oat drink after 4 days of storage.

TABLE 6

Recipes of the drinks and stability results

| Recipes (g/100 g) | drink S1 | reference oat drink |
|---|---|---|
| Strawberry juice | 7 | |
| Oat based material (DM) | 7.7 | 7.7 |
| Water | 85.3 | 92.3 |
| Stability results | | |
| Difference to the reference drink (%), 4 d | 0.0 | |

Example 6

Antioxidativity Test

The antioxidativity of oat based berry drink was studied with the DPPH method. The DPPH method measures the reduction of an stable free radical 2,2-diphenyl-1-picryl-hydrazyl (DPPH.). DPPH has an absorption band at 515 nm that disappears upon reduction by an antioxidant compound (J. Sci. Food Agric. 83(14):1403-1411).

The drink sample was prepared of oat suspension and sea buckthorn berry juice. The sea buckthorn berry juice and the oat suspension from example 1 were used. The berry content of the test drink was 7%. The same reference oat drink was used as in example 1.

TABLE 7

Recipes of the drinks (g/100 g)

| | reference oat drink | test drink |
|---|---|---|
| Sea buckthorn berry juice | — | 7 |
| Oat based material (DM) | 7.7 | 7.7 |
| Water | 92.3 | 85.3 |

The antioxidativities of the test drink and the reference drink were compared to the antioxidativity of vitamin C. The antioxidativity was measured spectrophotometrically by following the colour change of DPPH-radical after 4 min reaction time. All measurements were done by using concentration 0.25 mg/ml of total phenolics. Ascorbic acid (vitamin C) was used as the reference compound. The radical scavenging activity (antioxidativity) of vitamin C was 97.7%. The activity of vitamin C was set to 100% and the activities of the samples were compared to that.

TABLE 8

Antioxidativity results

| | antioxidant activity of the drink, compared to vitamin C (%) |
|---|---|
| vitamin C | 100 |
| reference oat drink | 0.6 |
| test drink | 1.9 |

The antioxidativity of the reference oat drink was improved by replacing part of the water with sea buckthorn berry juice.

Example 7

Sensory Analyses of Oat Based Berry Drinks Compared to Rice Based Berry Drinks

The taste of oat based berry drinks containing two strong tasting berries, lingonberry or cranberry, was compared to rice based drinks containing the same strong tasting berries.

The recipes were:

|  | oat lingonberry drink | rice lingonberry drink | oat cranberry drink | rice cranberry drink |
|---|---|---|---|---|
| commercial oat milk | 85 | — | 85 | — |
| commercial rice milk | — | 85 | — | 85 |
| lingonberry juice | 15 | 15 | — | — |
| cranberry juice | — | — | 15 | 15 |

Commercial oat milk (GoGreen) and rice milk (GoGreen) were used. The rice milk contained 0.4 g more glucose and 1.6 g more maltose/100 g than the oat milk. The rice milk also tasted sweeter than the oat milk. To eliminate the effects of the different sweetness on the results, saccharose was added to the oat milk to bring its sweetness to the same level as the rice drink's.

The sweetness of different monosaccharides is different. If the sweetness of saccharose is set to value 1, the sweetness of maltose is 0.5 and the sweetness of glucose is 0.7. To get the same sweetness to the commercial oat drink and the commercial rice drink, saccharose was added to the commercial oat drink. To compensate the difference in the maltose content (1.6 g), 0.8 g saccharose was added (0.5×1.6 g). To compensate the difference in the glucose content (0.4 g), 0.28 g saccharose was added (0.7×0.4 g). Therefore totally 1.08 g saccharose was added to 100 g of oat milk.

10 trained panellists evaluated the drinks. A pair-wise test was used, where the lingonberry drinks were compared to each other and cranberry drinks to each other. The panellists were asked which of the drinks had stronger taste. 9 out of 10 panellists rated the rice based lingonberry drinks as having a stronger taste than the oat based lingonberry drinks. All 10 panellists rated the rice based cranberry drinks having a stronger taste than the oat based cranberry drinks.

Oat based berry drinks did not have as strong taste as the rice berry drinks, although the sweetness of the commercial oat and rice milks that were used in the preparation of the drinks was the same. It is possible to prepare soft tasting drinks of the present invention of the strong tasting berries.

Example 8

Oat Based Sea Buckthorn Berry Drink

| Oat suspension | 84.1% | (9.4% dry weight) |
|---|---|---|
| Sea buckthorn berry juice | 7.0% | |
| Sucrose | 6.0% | |
| *Camelina* oil | 2.3% | |
| Pectin | 0.45% | |
| Colouring agent | 0.15% | |
| Vitamin C | | |

The oat suspension of the example 1 was used. The amount of oat based material was 7.9% of the weight of the drink. The amount of starch was 0.9% of the drink. The ratio of oat derived dry matter to 100% berry juice was 1:0.9 and the stability of the drink was good and the taste was soft.

Example 9

Oat Based Blackcurrant Drink

| Oat suspension | 93.2% |
|---|---|
| Blackcurrant juice | 5% |
| *Camelina* oil | 1.8% |

The oat suspension used in this example was prepared of oat flakes by using alpha amylase (Fungamyl, Novozymes) and glucoamylase (Optidex, L-400, Genencor International). Of the total sugars of the oat suspension, 91% was glucose and 3.5% maltose. The amount of oat based material was 11.9% of the weight of the drink. The amount of starch was 2.1% of the drink. The ratio of oat derived dry matter to 100% berry juice was 1:0.4. The stability of the drink was good and the taste was soft.

Example 10

Oat Based Cranberry Drink

| Oat suspension | 87.7% |
|---|---|
| Cranberry juice | 5.0% |
| Sucrose | 7.0% |
| Modified starch | 0.3% |

The oat suspension of example 1 was used. The amount of oat based material was 8.2% of the weight of the drink. The amount of starch was 1.3% of the drink. The ratio of oat derived dry matter to 100% berry juice was 1:0.6 and the stability of the drink was good and the taste was soft.

Example 11

Oat Based Lingonberry Cranberry Drink with Added Plant Stanol Ester

| Oat suspension | 76.9% |
|---|---|
| Lingonberry juice | 8.0% |
| Cranberry juice | 5.0% |
| Sucrose | 8.5% |
| Plant stanol ester | 1.6% |

The oat suspension was prepared as described in WO 03/075683 example 1. The amount of oat based material was 6.5% of the weight of the drink. The amount of starch was 0.9% of the drink. The ratio of oat derived dry matter to 100% berry juice was 1:2 and the stability of the drink was good and the taste was soft.

Example 12

Oat Based Sea Buckthorn Berry Drink

| Oat suspension | 87.0% |
| --- | --- |
| Sea buckthorn berry juice | 5.0% |
| Sucrose | 7.0% |

The oat suspension was prepared as described in WO 03/075683 example 1. The amount of oat based material was 6.7% of the weight of the drink. The amount of starch was 0.7% of the drink. The ratio of oat derived dry matter to 100% berry juice was 1:0.7 and the stability of the drink was good and the taste was soft.

Example 13

Oat Based Sea Buckthorn Berry Drink with Added Plant Stanol Ester

| Oat suspension | 70.2% |
| --- | --- |
| Sea buckthorn berry juice | 12.6% |
| Sucrose | 14.0% |
| Plant stanol ester | 3.0% |
| Colour (carrot extract) | 0.2% |

The oat suspension was prepared as described in WO 03/075683 example 1, except that no separation of the insoluble fibre took place. The amount of oat based material was 11% of the weight of the drink. The amount of starch was 2.2% of the drink. The ratio of oat derived dry matter to 100% berry juice was 1:1.1 and the stability of the drink was good and the taste was soft.

The invention claimed is:

1. A method for improving the stability of a drink, the method comprising the steps of:
providing an oat based material, which contains from about 0.01% to about 40% by dry weight of starch, wherein beta-glucan has been at least partly degraded;
providing a berry juice selected from the group consisting of sea buckthorn berry juice, lingonberry juice, cranberry juice, red currant juice, black currant juice, gooseberry juice, bog whorthleberry juice, crowberry juice, chokeberry juice and mixtures thereof;
mixing the oat based material, water and the berry juice to obtain a drink comprising the berry juice in an amount from about 5 to about 40% by weight, the oat based material as dry matter in an amount from 3 to 30% by weight and the starch in an amount of about 0.01% to about 2.5% by weight of the drink.

2. The method according to claim 1, wherein the oat based material and at least part of the water is added in the form of an oat suspension.

3. The method according to claim 2, wherein the oat suspension is added in an amount from 60 to 95% by weight of the drink.

4. The method according to claim 1, wherein the drink comprises an oat suspension which comprises the oat based material and at least part of the water.

5. The method according to claim 4, wherein the drink comprises the oat suspension in an amount from 60 to 95% by weight.

6. The method according to claim 1, wherein the berry juice is selected from the group consisting of sea buckthorn berry juice, lingonberry juice, cranberry juice, red currant juice, black currant juice, gooseberry juice and mixtures thereof.

7. The method according to claim 1, wherein an amount of berry juice is from 5.5 to 35% by weight of the drink.

8. The method according to claim 1, wherein an amount of oat based material as dry matter is 4-25% by weight.

9. The method according to claim 1, wherein a weight ratio of oat based material as dry matter to berry juice is from 1:0.3 to 1:5.

10. The method according to claim 1, wherein the berry juice is selected from the group consisting of sea buckthorn berry juice, lingonberry juice, cranberry juice, red currant juice, and black currant juice and a weight ratio of oat based material to berry juice is from 1:0.3 to 1:2.

11. The method according to claim 1, wherein the drink has a viscosity of at most 700 mPas.

12. The method according to claim 1, wherein the oat based material comprises starch from 0.5 to 30% by dry weight of the oat based material.

13. The method according to claim 1, wherein an amount of starch in the drink is from 0.03 to 2.0% by weight.

14. The method according to claim 1, wherein the drink further comprises at least one of a plant sterol, a plant stanol, an n-3 fatty acid, a dietary fibre, a probiotic, a vitamin, a mineral or mixtures thereof.

15. The method according to claim 14, wherein the drink further comprises at least one of plant sterol ester and plant stanol ester in an amount from 0.1 to 10% by weight of the drink.

16. The method according to claim 14, wherein the drink further comprises oil having a fatty acid content of at least 5% n-3 fatty acids in an amount from 0.1 to 10% by weight of the drink.

17. The method according to claim 1, wherein the berry juice selected from the group consisting of sea buckthorn berry juice, lingonberry juice, cranberry juice, red currant juice, black currant juice and mixtures thereof.

18. The method according to claim 1, wherein the berry juice selected from the group consisting of sea buckthorn berry juice, lingonberry juice, cranberry juice, red currant juice, and mixtures thereof.

19. The method according to claim 1, wherein the berry juice selected from the group consisting of sea buckthorn berry juice, lingonberry juice, cranberry juice, and mixtures thereof.

20. The method according to claim 1, wherein the berry juice selected from the group consisting of sea buckthorn berry juice, lingonberry juice, and mixtures thereof.

* * * * *